United States Patent
Pizzi et al.

(10) Patent No.: US 6,888,142 B2
(45) Date of Patent: May 3, 2005

(54) MICROMIRROR WITH ELECTROSTATICALLY CONTROLLED MICROSHUTTER, MATRIX OF MICROMIRRORS AND INFRARED SPECTROPHOTOMETER COMPRISING SAID MATRIX

(75) Inventors: Marco Pizzi, Turin (IT); Valerian Koniachkine, Novosibisk (RU)

(73) Assignee: C.R.F. Societa Consortile per Azioni, Orbassano (IT)

( * ) Notice: Subject to any disclaimer, the term of this patent is extended or adjusted under 35 U.S.C. 154(b) by 222 days.

(21) Appl. No.: 10/313,620

(22) Filed: Dec. 6, 2002

(65) Prior Publication Data

US 2003/0117733 A1 Jun. 26, 2003

(30) Foreign Application Priority Data

Dec. 7, 2001 (IT) ........................................ TO01A1142

(51) Int. Cl.⁷ ................................................ G02B 5/08
(52) U.S. Cl. ............................ 250/339.07; 250/339.06; 250/339.01; 250/338.1; 250/336.1; 359/896
(58) Field of Search ...................... 250/339.07, 339.06, 250/339.01, 338.1, 336.1; 359/896

(56) References Cited

U.S. PATENT DOCUMENTS

| 3,989,357 A | * | 11/1976 | Kalt | ............................ 359/231 |
|---|---|---|---|---|
| 5,305,083 A | | 4/1994 | Marianik et al. | |
| 5,629,565 A | * | 5/1997 | Schlaak et al. | ............. 257/780 |
| 5,959,763 A | | 9/1999 | Bozler et al. | |
| 6,236,491 B1 | * | 5/2001 | Goodwin-Johansson | .... 359/291 |
| 6,396,620 B1 | * | 5/2002 | Goodwin-Johansson | .... 359/292 |
| 6,731,492 B2 | * | 5/2004 | Goodwin-Johansson | .... 361/233 |
| 2004/0046123 A1 | * | 3/2004 | Dausch | ....................... 250/351 |

FOREIGN PATENT DOCUMENTS

| EP | 1 008 885 A1 | 11/1999 | |
|---|---|---|---|
| EP | 1008885 A1 | * 6/2000 | ........... G02B/26/02 |
| EP | 1241508 A2 | * 9/2002 | ........... G02B/26/02 |
| EP | 1318426 A1 | * 6/2003 | ........... G02B/26/02 |

* cited by examiner

*Primary Examiner*—David Porta
*Assistant Examiner*—Christine Sung
(74) *Attorney, Agent, or Firm*—Brooks Kushman P.C.

(57) ABSTRACT

An optic device with a variable operating mode comprises a micromirror which can be obscured by means of an electrostatically controlled microshutter. In the operating condition of the microshutter, the petal of this adheres over a substrate to allow a beam of light to reach the mirror. In the condition at rest, the petal is curled up and one of its surfaces receives the beam of light and reflects it in all directions, at the same time preventing this from reaching the mirror.

16 Claims, 2 Drawing Sheets

US 6,888,142 B2

MICROMIRROR WITH ELECTROSTATICALLY CONTROLLED MICROSHUTTER, MATRIX OF MICROMIRRORS AND INFRARED SPECTROPHOTOMETER COMPRISING SAID MATRIX

BACKGROUND OF THE INVENTION

1. Field of the Invention

The present invention relates to electrostatically controlled optic devices with a variable operating mode, of the type comprising:

- a fixed support including a substrate in the form of a lamina a few millimeters or centimeters thick,
- an electrode composed of a film of electrically conductive material a few tens or hundreds of nanometers thick, applied to one side of the lamina constituting the substrate,
- a dielectric or ferroelectric insulating film with a thickness ranging from 0.1 micrometers to a few tens of micrometers, applied over the film constituting said electrode, and
- a movable petal, comprising a film of electrically conductive material, with a thickness ranging from a few fractions of micron to a few microns, having only an end portion connected rigidly to said insulating film and designed to assume an operating condition, in which it adheres completely with one of its surfaces, through electrostaticity, over said insulating film when an electric voltage is applied between said electrode and said petal, and a condition at rest, curled up, towards which the petal is drawn by its own elasticity when no electric voltage is applied, and in which a predominant portion of the aforesaid surface of the petal is spaced from said insulating film.

2. Background Art

A device of this type was proposed for example in the European patent application EP-A-1 008 885 by the same Applicant.

SUMMARY OF THE INVENTION

The object of the present invention is to produce an improved device of the type indicated above which is susceptible to various applications, among which in particular application for the production of an infrared spectrophotometer, the operation of which is reliable and efficient.

With a view to attaining this object, the invention relates to a device of the type indicated above, wherein said surface of the petal capable of adhering to the insulating layer is predisposed as a reflecting surface, designed to reflect and diffuse in all directions a beam of light incident on it when the petal is in the position at rest, and wherein over said substrate a mirror is predisposed designed to receive and reflect said beam of light when this is not intercepted by the electrostatically controlled petal, and when the latter is in its operating position, so that said device constitutes a micromirror that can be obscured by means of an electrostatically controlled microshutter.

The device thus produced has the advantage that the characteristics and the quality of the mirror do not depend on the micromachinings utilized to produce the petal.

The aforesaid mirror has a substrate which may be composed of the same surface of the substrate to which the petal adheres, or by an additional substrate applied over the substrate of the petal. The mirror may be disposed with the reflecting surface parallel to the surface of the substrate of the petal, or inclined in relation to this.

It is possible to provide a matrix arrangement of a plurality of micromirrors associated with electrostatically controlled microshutters according to the arrangement described above. A matrix of this type may, for example, be utilized advantageously in an infrared spectrophotometer, in which the micromirrors of the matrix are selected, by means of the relative microshutters, in order to select predetermined frequencies of a beam of light with dispersed chromatic components.

A further advantage of the device according to the invention resides in the fact that the petal supplied with electric voltage is never struck by the beam of light and therefore does not become nearly as hot as it would if the surface of the petal were to serve as a micromirror, thus allowing more intense beams to be modulated.

BRIEF DESCRIPTION OF THE DRAWINGS

Further characteristics and advantages of the invention shall become apparent from the description below with reference to the accompanying drawings, provided purely as a non-limiting example, in which.

DETAILED DESCRIPTION OF THE PREFERRED EMBODIMENTS

Figure 1:
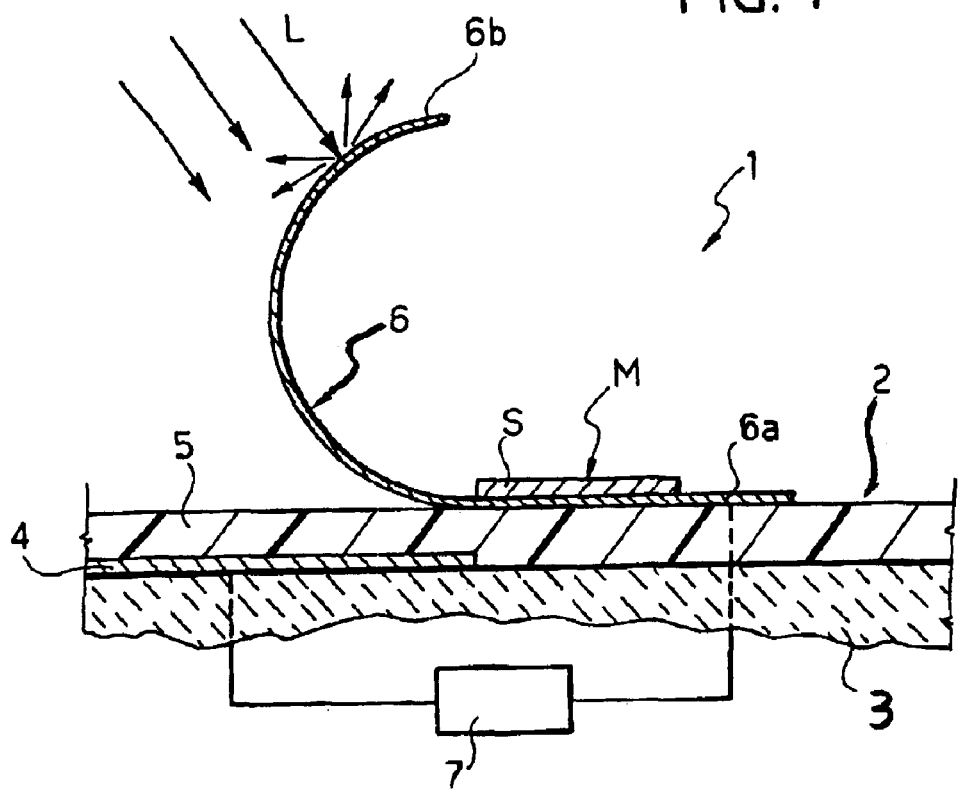
FIGS. 1, 2 are schematic sectional views which show a first embodiment of a micromirror with electrostatically controlled microshutter, in the condition at rest and in the operating condition of the petal.
Figure 2:
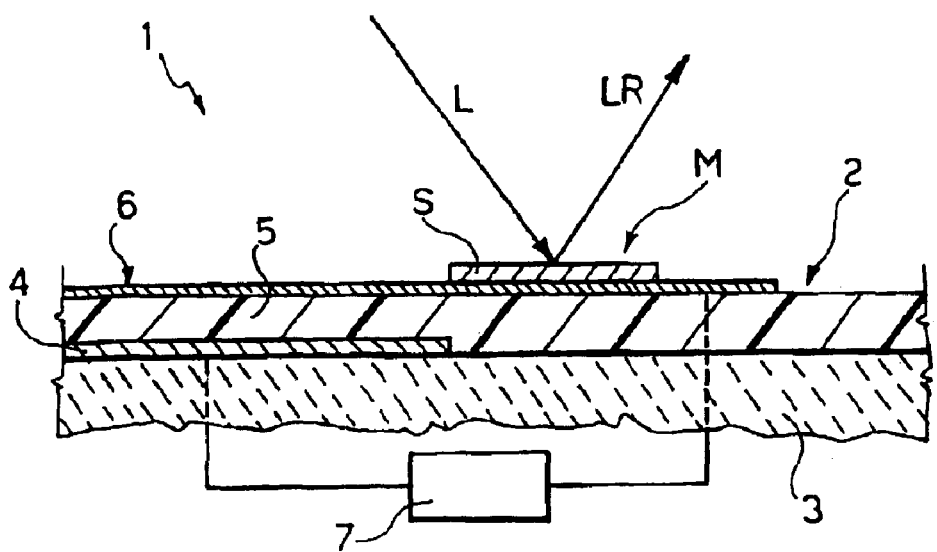

FIGS. 1, 2 show a first embodiment of the device according to the invention. The device, indicated as a whole with the reference numeral 1, comprises a fixed support 2 including a substrate 3 generally composed of a lamina of glass or plastic material a few millimeters or centimeters thick. In general, the thickness of the substrate 3 may range from a few micrometers to a few nanometers. In the device according to the invention the substrate 3 may be transparent or non-transparent. A layer 4 of conducting material, a few tens or hundreds of nanometers thick, which defines an electrode of the device, is produced on the surface of the substrate 3 by evaporation, spin-coating, screen-printing or dipping. More specifically, the thickness of the electrode 4 may range from 10 to 200 nanometers. The conductive layer 4 is subsequently insulated with a layer 5 of dielectric or ferroelectric insulating material, the thickness of which may vary from 0.1 micrometers to a few tens of micrometers, typically from 0.8 to 3 micrometers. This layer 5 can be obtained by screen-printing, spin-coating or dipping. The reference numeral 6 indicates the movable part of the device which is composed of a metallic film with a thickness ranging from a few fractions of micron to a few microns (petal). The petal 6 has an end portion 6a connected rigidly to the exposed surface of the insulating layer 5, while the remaining part tends to assume, through its elasticity, a curled up configuration when at rest, shown in FIG. 1. The curled up configuration may naturally also differ from the one shown in this figure, as it generally suffices for the petal in its position at rest to be raised and spaced from the surface of the insulation layer 5. The dimensions (length and width) of the petal 6 vary as a function of the type of shutter required and the type of matrix in which this is destined to be inserted. In FIGS. 1, 2 the block indicated with 7 schematically shows the means to apply an electric voltage between the electrode 4 and the petal 6. By applying this voltage, the petal 6 is uncurled through electrostaticity on the surface of the insulating layer 5 adhering over this. If, on the other hand, there is no voltage between the petal 6 and the electrode 4, the petal 6 assumes the configuration at rest shown in FIG. 1.

Figure 3:
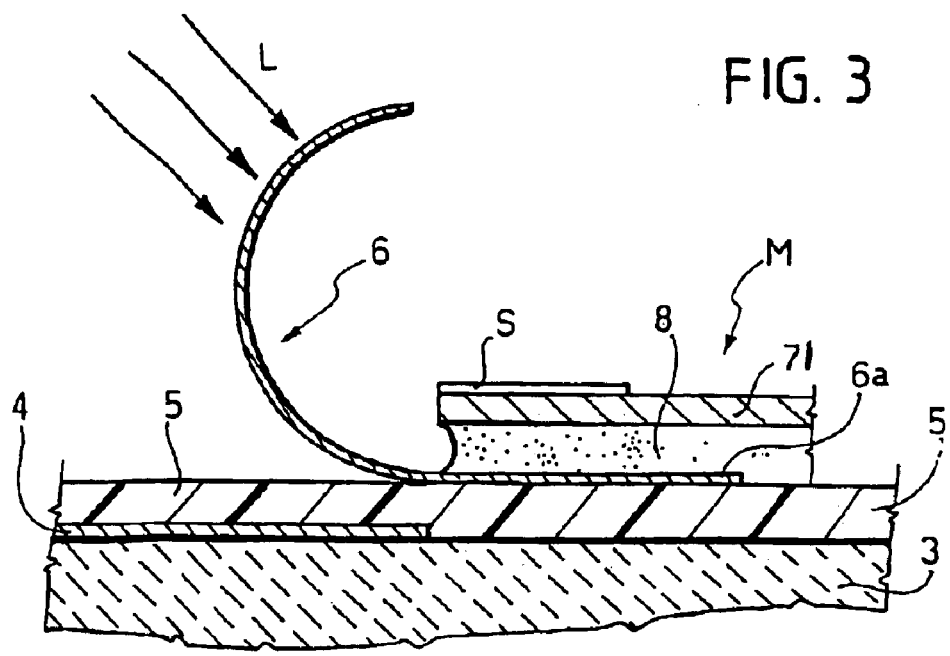
FIG. 3 shows a variant of FIG. 2.

According to the invention, the surface 6b of the petal 6 which adheres to the insulating layer 5 in the operating condition shown in FIG. 2, is predisposed to constitute a reflecting surface which, in the condition at rest of the petal (FIG. 1) is designed to reflect and diffuse in all directions a beam of light L incident on it. Again according to the invention, over the fixed support 2, and in particular over the portion 6a of the petal 6 which adheres to the fixed support, a mirror M is provided which is able to receive the beam of light L only when the petal 6 is in its operating condition shown in FIG. 2. In this condition, the beam of light L is received by the mirror M and reflected in a direction LR. The petal 6 therefore constitutes an electrostatically controlled microshutter which is able to enable or disable the arrival of the beam of light L over the mirror M. This mirror is not composed of the same upper surface of the petal 6, but comprises a reflecting layer S, for example composed of a film of gold, applied over a substrate. In the case in FIGS. 1, 2, the substrate of the mirror is the same substrate as the petal 6. FIG. 3 shows a solution in which the mirror M comprises a layer of gold S deposited over the layer of silicon 71 in turn fixed over the portion 6a of the petal 6 and over the insulating layer 5 by means of a layer 8 of heat insulating binding material.

As already shown above, it is possible to provide a linear array or a bi-dimensional matrix composed of a plurality of devices of the type shown in FIGS. 1, 2 or in FIG. 3. In this case electronic control means are naturally provided designed to control the application of voltage to the various electrostatically controlled microshutters to select predetermined frequencies of a beam of light with suitably dispersed chromatic components. A device of this type may be applied advantageously in an infrared spectrophotometer. As the mirror M is produced as a separate element from the petal 6, the quality of the mirror does not depend on the micromachinings utilized to produce the petals and may therefore, if necessary, be extremely high. The petal 6, supplied with electric voltage, is never struck directly by the beam of light and therefore does not become nearly as hot, allowing modulation of more intense beams.

Figure 4:
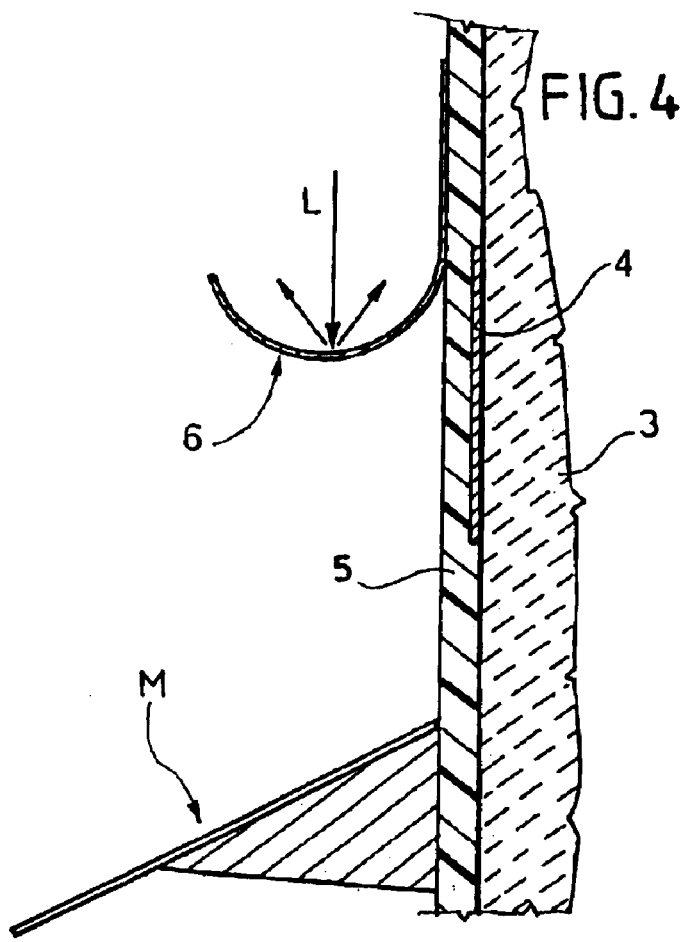
FIG. 4 shows a variant in the direction of the mirror of the device.

FIG. 4 shows a variant in which the mirror M is directed with its reflecting surface inclined in relation to the plane of the substrate 3, unlike the situation in FIGS. 1, 2 and 3, in which the mirror M is parallel to the surface of the substrate 3.

Naturally, without prejudice to the principle of the finding, the constructional details and embodiments may vary widely in relation to what is described and shown purely as an example, without however departing from the scope of the present invention.

For example, a refractive or diffractive optic element may be associated with the mirror M. The reflecting surface of the petal may be provided with thin optic elements, such as binary diffractive optic elements. The mirror may also be composed of diffractive optic microridges of a height ranging from 0.2 to 2 microns.

What is claimed is:

1. Electrostatically controlled optic device with a variable operating mode, comprising:
   a fixed support including a substrate in the form of a lamina a few millimeters or centimeters thick,
   an electrode composed of a film of electrically conductive material a few tens or hundreds of nanometers thick, applied to one side of the lamina constituting the substrate,
   a dielectric or ferroelectric insulating film with a thickness ranging from 0.1 micrometers to a few tens of micrometers, applied over the film constituting said electrode, and
   a movable petal, comprising a film of electrically conductive material, with a thickness ranging from a few fractions of micron to a few microns, having only an end portion connected rigidly to said insulating film and designed to assume an operating condition, in which it adheres completely with one of its surfaces, through electrostaticity, over said insulating film when an electric voltage is applied between said electrode and said petal, and a condition at rest, curled up, towards which the petal is drawn by its own elasticity when no electric voltage is applied, and in which a predominant portion of the aforesaid surface of the petal is spaced from said insulating film,
   wherein said surface of the petal is predisposed as a reflecting surface, designed to reflect and diffuse in all directions a beam of light incident on it when the petal is in the position at rest, and
   wherein a mirror in the form of a planar reflective layer is provided as a separate element both with respect to said petal and said substrate, said mirror being fixed over said substrate on the same side thereof as said petal, so as to receive and reflect said beam of light when the beam of light is not intercepted by the electrostatically controlled petal, that is when said petal is not in its position at rest, so that said device constitutes a micromirror that can be obscured by means of an electrostatically controlled microshutter.

2. Optic device according to claim 1, wherein the mirror has a substrate composed of the same surface of the substrate to which the petal adheres.

3. Optic device according to claim 2, wherein the mirror comprises a reflecting layer, applied over the portion of the petal which adheres to the substrate.

4. Optic device according to claim 1, wherein the mirror has an additional substrate which fixes the mirror over the substrate.

5. Optic device according to claim 4, wherein said mirror comprises a reflective layer, applied over said additional substrate, and wherein said additional substrate, for example composed of silicon, is applied over said portion of the petal which is fixed to the substrate by means of interposition of a layer of heat insulating binding material, such as polyamide or epoxy resin.

6. Optic device according to claim 1, wherein the mirror has a flat reflecting surface parallel to the surface of the substrate.

7. Optic device according to claim 6, wherein the mirror is applied over the portion of the petal which is fixed to the substrate.

8. Optic device according to claim 1, wherein the mirror has a reflecting surface inclined in relation to the surface of the substrate.

9. Matrix of micromirrors which can be obscured by means of electrostatically controlled microshutters, wherein the matrix comprises a plurality of devices according to claim 1.

10. Infrared spectrophotometer comprising a matrix according to claim 9, and electronic control means to control the application of voltage to the various electrostatically controlled microshutters in order to select predetermined frequencies of a beam of light with dispersed chromatic components.

11. Optic device according to claim 1, wherein the mirror is associated with a refractive or diffractive optic element.

12. Optic device according to claim 1, wherein said reflecting surface of the petal is predisposed with thin optic elements, for example binary diffractive optic elements.

13. Optic device according to claim 1, wherein said mirror is composed of microridges of a height of 0.2 to 2 microns.

14. Optic device according to claim 1, wherein the mirror is applied over the portion of the petal which is fixed to the substrate.

15. Electrostatically controlled optic device with a variable operating mode, comprising:

a fixed support including a substrate in the form of a lamina a few millimeters or centimeters thick, an electrode composed of a film of electrically conductive material a few tens or hundreds of nanometers thick, applied to one side of the lamina constituting the substrate, a dielectric or ferroelectric insulating film with a thickness ranging from 0.1 micrometers to a few tens of micrometers, applied over the film constituting said electrode, and a movable petal, comprising a film of electrically conductive material, with a thickness ranging from a few fractions of micron to a few microns, having only an end portion connected rigidly to said insulating film and designed to assume an operating condition, in which it adheres completely with one of its surfaces, through electrostaticity, over said insulating film when an electric voltage is applied between said electrode and said petal, and a condition at rest, curled up, towards which the petal is drawn by its own elasticity when no electric voltage is applied, and in which a predominant portion of the aforesaid surface of the petal is spaced from said insulating film, wherein said surface of the petal is predisposed as a reflecting surface, designed to reflect and diffuse in all directions a beam of light incident on it when the petal is in the position at rest, and wherein over said substrate a mirror is predisposed, designed to receive and reflect said beam of light when it is not intercepted by the electrostatically controlled petal, that is when said petal is in its position at rest, so that said device constitutes a micromirror that can be obscured by means of an electrostatically controlled microshutter, wherein the mirror has a substrate composed of the same surface of the substrate to which the petal adheres, wherein the mirror comprises a reflecting layer applied over the portion of the petal which adheres to the substrate.

16. Electrostatically controlled optic device with a variable operating mode, comprising:

a fixed support including a substrate in the form of a lamina a few millimeters or centimeters thick, an electrode composed of a film of electrically conductive material a few tens or hundreds of nanometers thick, applied to one side of the lamina constituting the substrate, a dielectric or ferroelectric insulating film with a thickness ranging from 0.1 micrometers to a few tens of micrometers, applied over the film constituting said electrode, and a movable petal, comprising a film of electrically conductive material, with a thickness ranging from a few fractions of micron to a few microns, having only an end portion connected rigidly to said insulating film and designed to assume an operating condition, in which it adheres completely with one of its surfaces, through electrostaticity, over said insulating film when an electric voltage is applied between said electrode and said petal, and a condition at rest, curled up, towards which the petal is drawn by its own elasticity when no electric voltage is applied, and in which a predominant portion of the aforesaid surface of the petal is spaced from said insulating film, wherein said surface of the petal is predisposed as a reflecting surface, designed to reflect and diffuse in all directions a beam of light incident on it when the petal is in the position at rest, and wherein over said substrate a mirror is predisposed, designed to receive and reflect said beam of light when it is not intercepted by the electrostatically controlled petal, that is when said petal is in its position at rest, so that said device constitutes a micromirror that can be obscured by means of an electrostatically controlled microshutter, wherein said mirror is composed of microridges of a height of 0.2 to 2 microns.

* * * * *

UNITED STATES PATENT AND TRADEMARK OFFICE
CERTIFICATE OF CORRECTION

PATENT NO. : 6,888,142 B2
DATED : May 3, 2005
INVENTOR(S) : Marco Pizzi et al.

It is certified that error appears in the above-identified patent and that said Letters Patent is hereby corrected as shown below:

Column 4,
Line 49, delete "reflective" and insert -- reflecting --.

Signed and Sealed this

Nineteenth Day of July, 2005

JON W. DUDAS
*Director of the United States Patent and Trademark Office*